(No Model.)

J. D. TYNES.
NUT LOCK.

No. 545,617. Patented Sept. 3, 1895.

WITNESSES:
Fred G. Dieterich
Edw. W. Byrn

INVENTOR
Jefferson D. Tynes.
BY Munn & Co
ATTORNEYS.

UNITED STATES PATENT OFFICE.

JEFFERSON D. TYNES, OF FORT SMITH, ARKANSAS.

NUT-LOCK.

SPECIFICATION forming part of Letters Patent No. 545,617, dated September 3, 1895.

Application filed December 18, 1894. Serial No. 532,147. (No model.)

*To all whom it may concern:*

Be it known that I, JEFFERSON D. TYNES, of Fort Smith, in the county of Sebastian and State of Arkansas, have invented a new and useful Improvement in Nut-Locks, of which the following is a specification.

The object of my invention is to provide a simple and practical nut-lock of cheap construction, which shall effectively lock the nut against coming off.

It relates to that class of nut-locks which are constructed as spring-washers; and it consists of a single metal bar bent or fashioned in a peculiar shape, as will be hereinafter fully described with reference to the drawings, in which—

Figure 1:
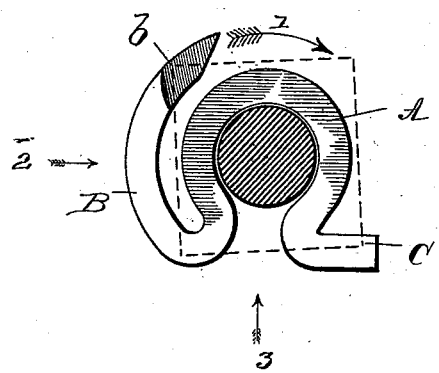
Figure 2:
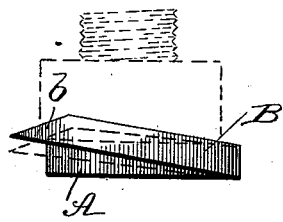
Figure 3:
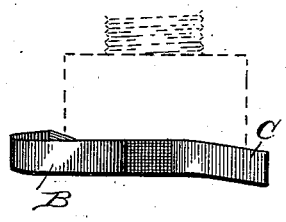

Figure 1 is a face view of the nut-lock shown applied to the bolt with the locked position of the nut indicated in dotted lines. Fig. 2 is an edge view of the same, looking in the direction of the arrow 2 in Fig. 1; and Fig. 3 is another edge view looking in the direction of the arrow 3 in Fig. 1.

A represents a metal bar, preferably of steel, bent around to nearly a complete circle so as to leave an opening and form a sort of washer through which the bolt passes. This bar has two outturned ends forming a long arm B and a short arm C. The long arm B is curved around the outer periphery of the washer through about one-third to one-half of its circumference, and terminates on its outer face in a beveled or inclined faced end b. This arm does not lie in the same plane as the body of the washer, but is deflected outwardly or upwardly, as shown in Fig. 2. The other arm C is also deflected out of the plane of the body of the washer, but is turned slightly inward or downward, as shown in Fig. 3, so as to bind against the backing or bearing plate and form a resilient or spring washer when the nut is turned up hard against the face of the same.

In applying the nut-lock it is put upon the bolt with the long arm B on the left-hand side (for right-hand nuts) and the nut is then screwed upon the bolt in the direction of the arrow 1. When the nut reaches a bearing against the washer, the corner of the nut presses upon the outer face of spring-arm B and forces it inwardly or downwardly, as indicated in dotted lines in Fig. 2, until the corner of the nut passes onto the bevel face b at the end. Then the arm springs outwardly slightly, causing the end of the arm B to pass slightly into the plane of the nut and to lie behind the corner, in which relation it locks the nut by a compound action, first, by a positive or rigid lock, owing to the fact that a part of the arm B is behind the corner of the nut and in the plane of the same, and, secondly, by an outward spring-pressure exerted by the arm against the inner face of the nut in a direction at right angles to the plane of the nut. These two effects combine to make a very safe and positive nut-lock, and yet for turning off the nut the incline or bevel face b permits the nut to be strained backward and force the arm B inward or downward again against its spring-tension without damaging the same or injuring its efficiency for further use as a nut-lock.

I am aware of the fact that a nut-lock has heretofore been constructed of a bar having its ends bent around the bolts of two adjacent nuts with the ends beveled to afford a bearing against the inner face of the nut.

My invention is of a construction that makes it applicable to single isolated nuts, and it is distinguished by the following peculiarities: One arm B is bent from a point near the bottom edge of the nut in a curved line which is concentric with the bolt and body A of the washer. This causes the corner of the nut to ride up on the arm B throughout its entire length and never moves across this arm transversely or at right angles, as the arm B is curved to a uniform radius. The other end C of the bar is bent, as at C in Fig. 1, to form a flat bearing, which binds against the lower flange or base of the fish-plate or rail and prevents the bars from turning, while this same end is also offset from the plane of the body part of the bar by an inward bend C, which by contact with the backing or bearing plate gives resilience to the washer and helps to rigidly hold the washer against turning.

Having thus described my invention, what I claim as new, and desire to secure by Letters Patent, is—

1. A nut lock consisting of a bar having its ends curved around to form a bolt hole and having one of said ends bent back outside the body portion with a reversed curve of uniform radius and sprung outwardly and terminating in a beveled end, and having its other end bent to form a flat bearing substantially as and for the purpose described.

2. A nut lock consisting of a bar having its ends curved around to form a bolt hole, and having one of said ends bent backward and outside the body portion with a reversed curve of uniform radius and sprung outwardly and terminating in a beveled end, and having its other end bent to form a flat bearing and bent or sprung inwardly substantially as and for the purpose described.

JEFFERSON D. TYNES.

Witnesses:
WALTER H. EVANS,
D. M. SANDERSON.